(12) United States Patent
Kathail et al.

(10) Patent No.: US 7,006,532 B1
(45) Date of Patent: Feb. 28, 2006

(54) DYNAMICALLY BUILDING ENCAPSULATION AND DECAPSULATION CHAINS AT RUN TIME

(75) Inventors: Pradeep K. Kathail, Sunnyvale, CA (US); Claude A. Cartee, Los Altos, CA (US); Zhanhe Shi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 967 days.

(21) Appl. No.: 09/864,088

(22) Filed: May 23, 2001

(51) Int. Cl.
*H04J 3/24* (2006.01)

(52) U.S. Cl. .................. 370/474; 370/351; 370/392; 370/476

(58) Field of Classification Search ............. 370/351, 370/352, 353, 354, 356, 386, 389, 392, 400, 370/401, 465, 466, 469, 413, 415, 417, 429, 370/474, 476, 428
See application file for complete search history.

(56) References Cited

U.S. PATENT DOCUMENTS

| | | | |
|---|---|---|---|
| 5,267,239 A | 11/1993 | Pospischil et al. | |
| 5,745,758 A | 4/1998 | Shaw et al. | |
| 5,764,920 A | 6/1998 | Cook et al. | 395/200.68 |
| 5,867,666 A | 2/1999 | Harvey | 395/200.68 |
| 5,982,783 A | 11/1999 | Frey et al. | 370/467 |
| 5,983,269 A | 11/1999 | Mattson et al. | 709/221 |
| 6,092,110 A | 7/2000 | Maria et al. | 709/225 |
| 6,160,811 A | 12/2000 | Partridge et al. | 370/401 |
| 6,219,706 B1 | 4/2001 | Fan et al. | 709/225 |
| 6,226,267 B1 | 5/2001 | Spinney et al. | 370/235 |
| 6,236,660 B1 | 5/2001 | Heuer | |
| 6,240,084 B1 | 5/2001 | Oran et al. | 370/352 |
| 6,320,848 B1 | 11/2001 | Edwards et al. | 370/255 |
| 6,385,194 B1 | 5/2002 | Surprenant et al. | 370/353 |
| 6,578,084 B1 * | 6/2003 | Moberg et al. | 709/236 |
| 6,601,106 B1 | 7/2003 | Moberg et al. | |
| 6,611,522 B1 * | 8/2003 | Zheng et al. | 370/395.21 |
| 6,697,872 B1 * | 2/2004 | Moberg et al. | 709/238 |

OTHER PUBLICATIONS

Partridge, Craig, "A 50-Gbs IP Router," *IEEE/ACU Transaction* 1998, p. 237-248.

Morris, Robert, et al., "The Click Modular Router," 17th ACM Symposium on Operating System Principles (SOSP '99) Published as *Operating Systems Review* 34 (5) :217-231, Dec. 1999.

Kohler, Eddie, et al., "The Click Modular Router," available at http://www.pdocs.1cs.mit.edu/papers/click.tocs00.

* cited by examiner

*Primary Examiner*—Phirin Sam
(74) *Attorney, Agent, or Firm*—Hamilton, Brook, Smith & Reynolds, P.C.

(57) ABSTRACT

A method for dynamically building a packet processing chain includes providing a plurality of packet processing elements. For each element of a first subset of elements operations indications are provided. For each element of a second subset of elements, expectations indications are provided. Finally, the chain is built by combining elements to form the chain according to a configuration requirement. Elements are selected such that an element's indicated expectations are satisfied by the time it executes, as indicated by the operations indications of the previous chain element.

38 Claims, 10 Drawing Sheets

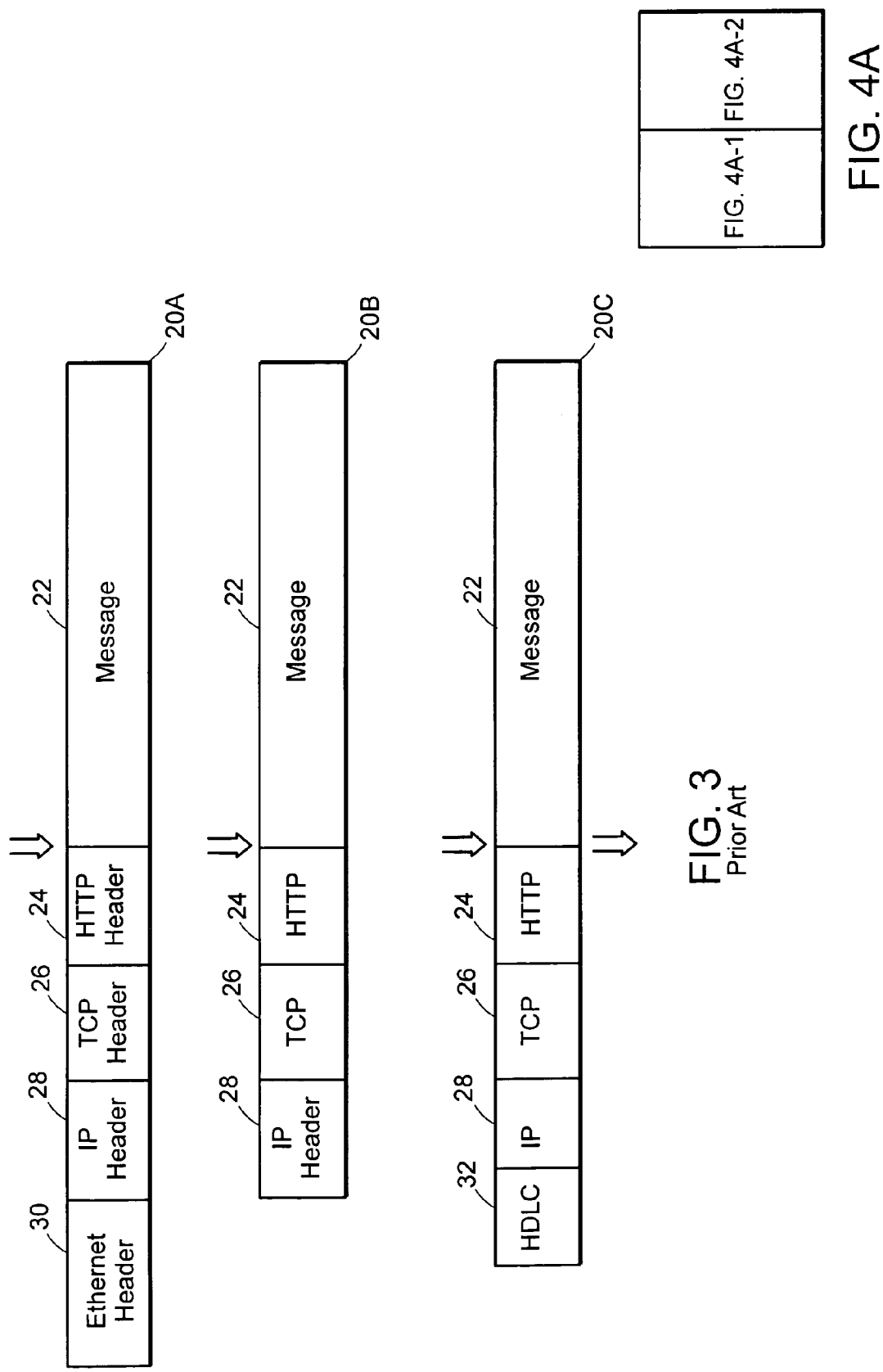

DYNAMICALLY BUILDING ENCAPSULATION AND DECAPSULATION CHAINS AT RUN TIME

BACKGROUND OF THE INVENTION

A network is a communication system that allows a user or application on a computer to access resources and exchange messages with users or applications on other computers. A network is typically a data communication system linking two or more computers and peripheral devices. It allows users to share resources on their own systems with other network users and to access information on centrally located systems or on systems that are located at remote offices. A network may provide connections to the Internet or to the networks of other organizations.

A network typically includes a cable that attaches to a network interface card (NIC) in each of the devices within the network.

Users interact with network-enabled software applications to make a network request, such as to get a file or print on a network printer. An application may also communicate with the network software, and the network software may then interact with the network hardware to transmit information to other devices attached to the network.

A local area network (LAN) is a network located in a relatively small area, such as a department or building. A LAN typically includes a shared medium to which workstations attach and through which they communicate with one another by using broadcast methods. With broadcasting, any device on a LAN can transmit a message that all other devices on the LAN can listen to. The device to which the message is addressed actually processes the message. Data is typically packaged into frames for transmission on the LAN.

FIG. 1 is a block diagram illustrating a network connection between a user 2 and a particular web server 6. This figure is an example, which may be consistent with any type of network, including a LAN, a wide area network (WAN), or a combination of networks, such as the Internet.

When a user 2 connects to a particular destination, such as a requested web server 6, the connection from the user 2 to the web server 6 is typically routed through several routers 4A–4D. Routers are internetworking devices, typically used to connect similar and heterogeneous network segments into Internetworks. For example, two LANs may be connected across a dial-up, integrated services digital network (ISDN), or a leased line via routers.

Routers are also found throughout the Internet. End users may connect to local Internet Service providers (ISPs), which are typically connected via routers to regional ISPs, which are in turn typically connected via routers to national ISPs.

To move packets from one network to another, packet processing software is required on each router. Generally, packets received from a network are processed and forwarded to another network, based on information contained in layers 2 and 3 of the ISO 7-layer model.

Layer 2 (L2) of the ISO model is commonly referred to as the data-link layer. Ethernet, HDLC and PPP are examples of commonly used L2 protocols. Ethernet is commonly used in LANs, while HDLC and PPP are commonly used in WANs.

Layer 3 (L3) is commonly referred to as the network layer. Internet Protocol (IP) is the most commonly used L3 protocol. ARP, SAP and SNAP are IP-related protocols that, although not strictly in layer 2, are considered to be layer 2 protocols for purposes herein.

Layer 4 (L4) is commonly referred to as the transport layer. TCP is the most commonly used L4 protocol.

Router software designers use the term encapsulation to refer to the layering of protocols. A packet containing TCP, IP and ethernet protocols is said to have an encapsulation of TCP over IP over ethernet. A packet containing TCP, IP and HDLC protocols has an encapsulation of TCP over IP over HDLC.

The proliferation of features and protocols has greatly complicated the software involved in processing packets. Because of this, the software responsible for each layer must examine each packet to determine what the next step is in the handling of the packet.

For example, when a packet is received on an ethernet interface, the ethernet protocol handling software must examine the header, and based on values in the header, determine what to do with the packet. Data contained within a packet, for example, a type or length field in the protocol header, contains information about the next layer of the packet.

A traditional ethernet processing algorithm for this might be:
  If type=IP and IP is configured for this interface
    Pass packet to IP code
  If type=ARP and ARP is configured for this interface
    Pass packet to ARP code
  If type=RARP and RARP is configured for this interface
    Pass packet to RARP code
  If type=IPV6 and IPV6 is configured for this interface
    Pass packet to IPV6 code Each time a new protocol is added, the ethernet code must be modified to handle the new protocol. This may be necessary for each layer every time new features or protocols are added.

Router software has grown to the point where maintenance has become very difficult. Each change can cause wide variations in performance. Depending on which features are configured, a packet might require more or less processing. For example, if input filtering is configured, then a packet must be processed by filtering code before being processed by IP code. When a new feature is added, packet processing code must be modified to accommodate the new feature. A new method is thus needed to allow growth in features and protocols without affecting the stability of existing software.

SUMMARY OF THE INVENTION

U.S. application Ser. No. 09/419,035, "PACKET PROCESSING USING ENCAPSULATION AND DECAPSULATION CHAINS," Moberg et al., U.S. application Ser. No. 09/418,781, "PACKET PROCESSING USING NON-SEQUENTIAL ENCAPSULATION AND DECAPSULATION CHAINS," Moberg et al., and U.S. Ser. No. 09/418,723, "DISTRIBUTED PACKET PROCESSING USING ENCAPSULATION AND DECAPSULATION," Moberg et al., each of which was filed on Oct. 15, 1999, and each of which is incorporated herein by reference in its entirety, describe various aspects of encapsulation and decapsulation chains.

According to an embodiment of the invention, a method for dynamically building a packet processing chain includes providing a plurality of packet processing elements or nodes. For each element of a first subset of elements operations indications are provided. For each element of a second subset of elements, expectations indications are provided. Of course, these subsets can overlap so that an element provides both expectations and operations indications. Furthermore, the subset can include the entire set of provided elements. Finally, the chain is built by combining elements to form the chain according to a configuration requirement. Elements are selected such that an element's indicated expectations are satisfied by the time it executes, as indicated by the operations indications of the previous chain element.

An expectation can be, for example, that a particular packet field holds a valid value, where that field holds a pointer to a datagram start or a network layer start. Another example is the expectation that some protocol encapsulation header has been added to or removed from a packet. Other examples of expectations are that predetermined encapsulations, decapsulations or service functions have or have not been performed.

One embodiment of the present invention implements expectation and operation indications by utilizing 32-bit "magic numbers" for simplicity and performance. A range of magic numbers is reserved for every defined expectation and operation.

In one embodiment, building the chain can be performed in response to, but is not limited to, a power-up, modification to the configuration requirement, or creation of a new configuration requirement.

In one embodiment, chain elements perform at least one encapsulation function or one decapsulation function, or both. Some encapsulation and decapsulation functions will transform a packet, while others may not.

In one embodiment, chain elements perform at least one service function, such as, but not limited to, input or output filtering, network address translation, compression and/or encryption.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a schematic diagram illustrating decapsulation and encapsulation of a message as performed by a router.

DETAILED DESCRIPTION OF THE INVENTION

Figure 2:
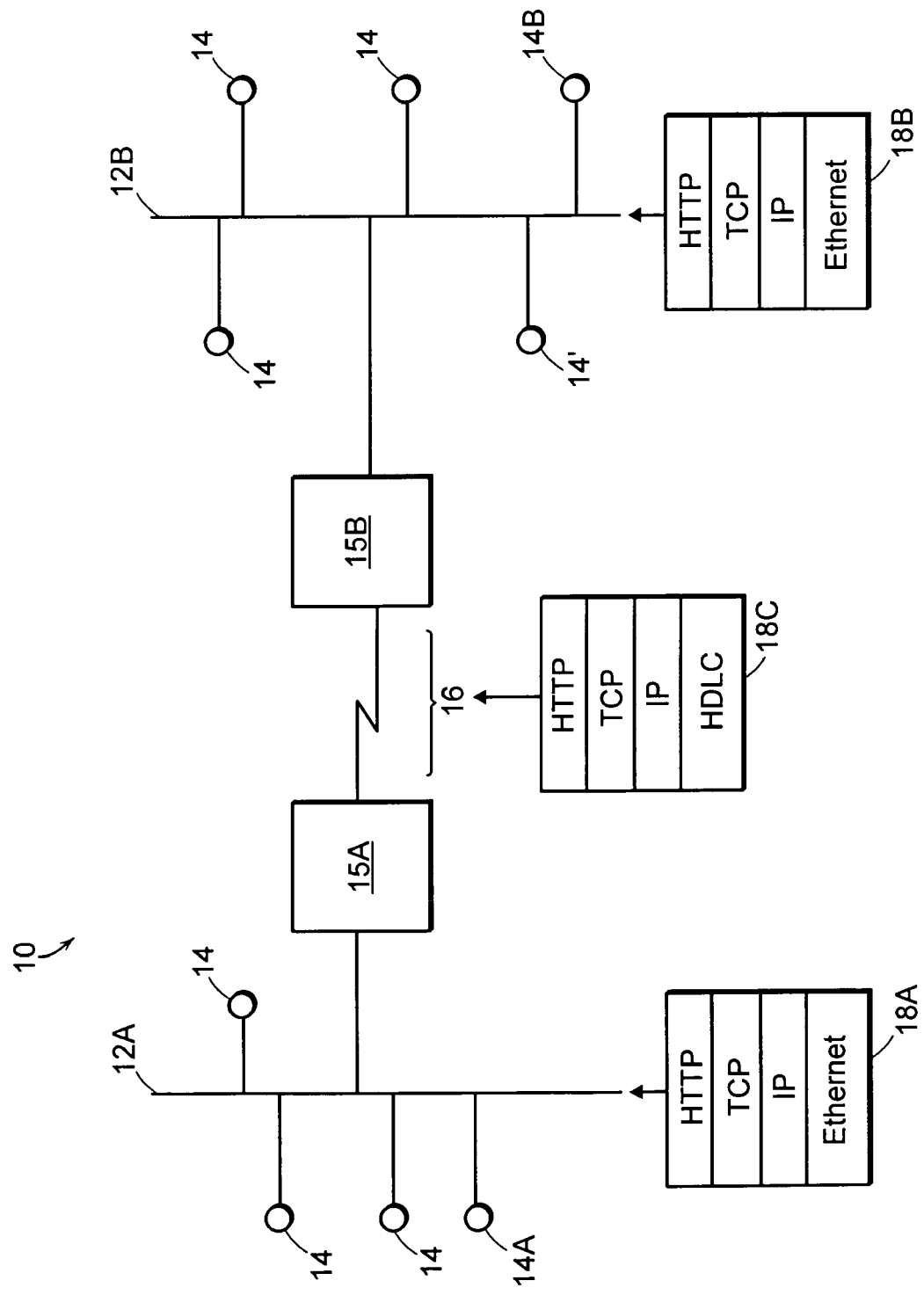
FIG. 2 is a block diagram illustrating a simple network connecting a user on an ethernet LAN to a remote server on a different ethernet LAN, with a serial WAN using HDLC connecting the two LANs.

FIG. 2 illustrates a simple network 10 connecting a user 14A on a first ethernet LAN 12A with a remote server 14B on a second ethernet LAN 12B, with a serial WAN 16 using HDLC to connect the two LANs 12A, 12B. Two routers 15A and 15B provide the interfaces between the two types of networks.

The ethernet LANs 12A, 12B use ethernet protocol, while the serial WAN 16 uses HDLC protocol. For a TCP packet originating with the user 14A to reach the server 14B, the routers 15A, 15B must change the encapsulation from ethernet to HDLC, and then back to ethernet. These encapsulations are associated with and configured for each interface.

Local area network 12A uses, for example, the protocol shown in block 18A. Here, HTTP protocol is used by the application. TCP and IP protocols as well as ethernet protocol are used throughout the local area network. The same protocols are used in local area network 12B as shown in block 18B.

The wide area network 16, however, uses HDLC protocol instead of ethernet, as shown in block 18C, because this protocol is better suited to wide area networks. Therefore, it is necessary for the routers 15A, 15B to translate packets from the ethernet Protocol to HDLC protocol and back to ethernet protocol.

Either router 15A or 15B may additionally perform other services such as input or output packet filtering, network address translation, etc.

FIG. 3 illustrates basic decapsulation and encapsulation as performed by router 15A of FIG. 2. An incoming packet 20A contains a message or other data 22 which is encapsulated with an HTTP header 24 which in turn is encapsulated with a TCP header 26. This in turn is encapsulated with an IP header 28 and the packet is finally encapsulated in an ethernet frame, including an ethernet header 30.

The router 15A reformats and readdresses the packet by stripping off the ethernet header 30, or decapsulating the frame, and reading the IP header 28 to obtain a destination address. The packet now appears as shown at 20B.

Next the router prepends the packet with an HDLC header 32 as shown at 20C. The router has thus encapsulated the message in a HDLC packet format.

In practice, the decapsulation and encapsulation processes can be more complex, including compression, encryption and other functions. The present invention breaks these functions into individual elements, and dynamically chains the elements together at runtime, as needed, using a linked chain structure in one embodiment. For example, a chain can be dynamically built at the start of a session or as session configuration parameters change. Each session can then have its own chain.

A chain walker processes a packet by walking through a chain, passing the packet to each element in the chain, until either processing is completed, the chain is halted, or the packet is dropped. Each element also has the ability to "punt" the packet to an external software or hardware function, and the punted packet may be returned anywhere in the chain, or may not be returned at all.

Figures 1, 4A:
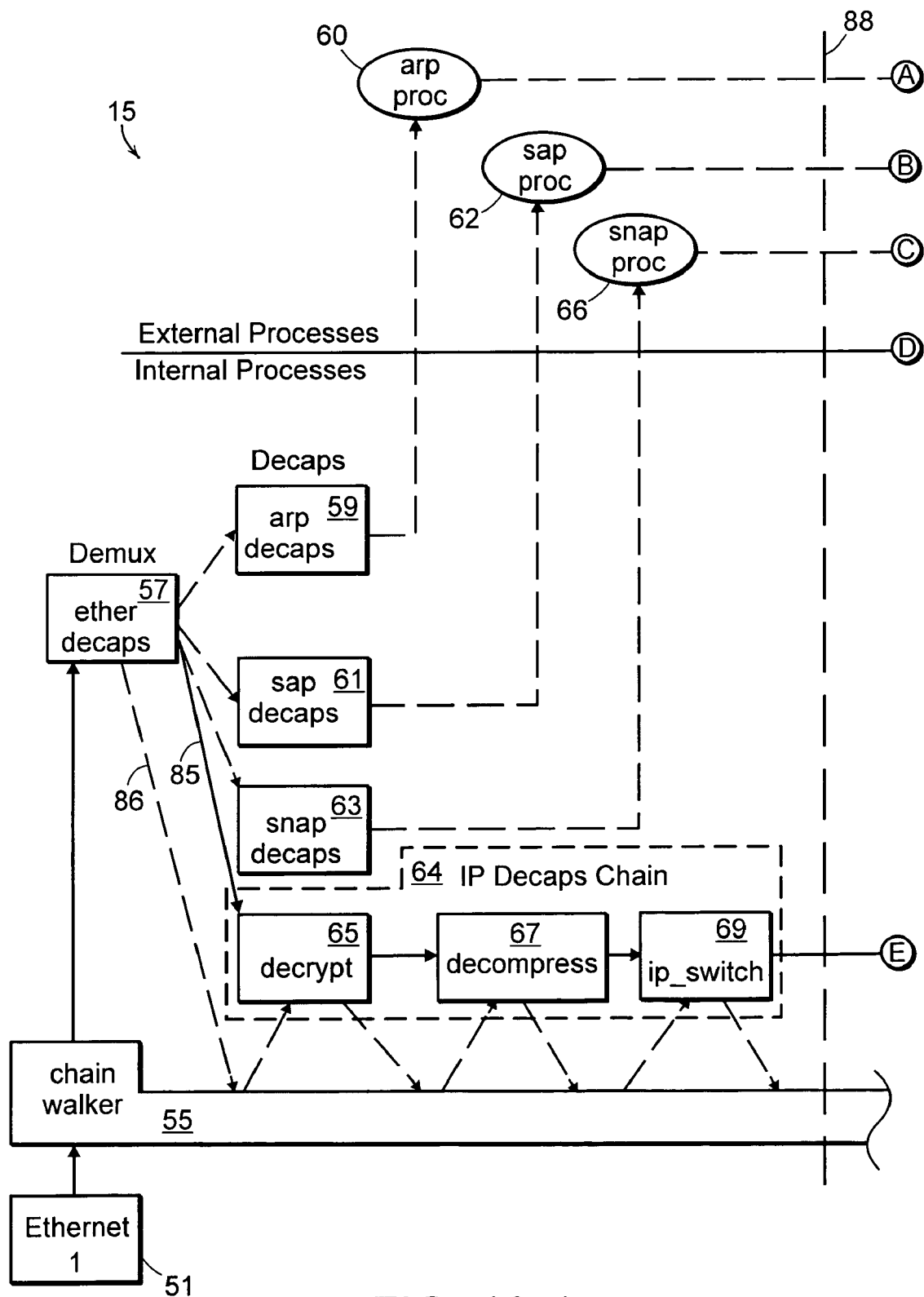
FIG. 4A is a schematic diagram illustrating an embodiment of the present invention including a chain walker.
Figures 2, 4A:
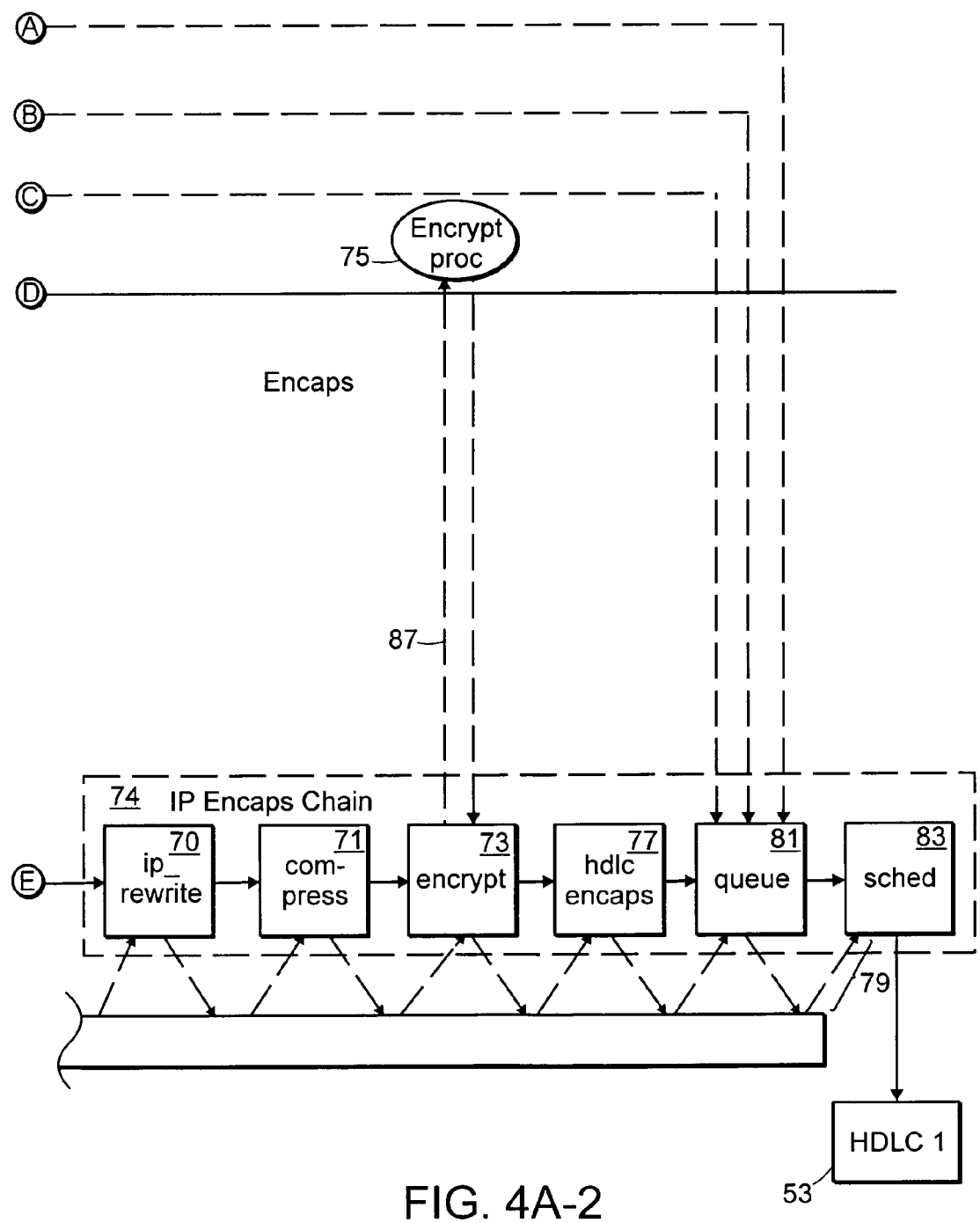

FIG. 4A illustrates an embodiment of a chain walker. The router shown 15 represents either router 15A or 15B of FIG. 2. While a typical router may have multiple interfaces, only two 51, 53 are shown in FIG. 4A.

When a packet is received by the router 15, it is passed to the chain walker 55. The chain walker 55 in turn retrieves a pointer to a de-multiplexor, or demux, element. Because in this example, interface 51 is an ethernet interface, the demux element 57 performs an ethernet decapsulation operation. For other types of interfaces, other decapsulation functions would be used in the demux chain.

The demux operation or element 57 determines the protocol of the next higher level (L3) used by the incoming packet, and passes the packet to an appropriate decapsulation chain. Although it will be understood that there can be many more, four possible decapsulation chains are shown: an ARP decapsulation chain comprising a single element arp_decaps 59; a SAP decapsulation chain comprising a single element sap_decaps 61; a SNAP decapsulation chain comprising a single element snap_decaps 63; and a multi-element IP decapsulation chain 64.

Of course, other decapsulation chains can exist for processing other protocols as well. For illustrative purposes, assume the packet uses internet protocol (IP). In this case, the demux element Ether_decaps 57 returns a pointer to the first element 65 of the IP decapsulation chain 64 to the chain walker 55, as indicated by dotted line 86. Logically, decrypt 65 follows ether_decaps 57 as indicated by solid arrow 85.

Decrypt 65 is the first element in the IP decapsulation chain 64. In this example, the decapsulation chain 64 is shown to comprise a decryption element 65, a decompression element 67, and an ip_switch element 69. In an actual application, some or all of these elements may be absent, or additional elements may be in the chain.

It should be understood that other service element nodes may have executed based on a user-supplied configuration. For example, if an input access list has been configured, then an input filtering node will execute before an ip_switch node.

In actuality, for IP packets that are switched, there is no decapsulation, although the term "decapsulation chain" is retained. The ip_switch element 69 determines if the packet is to be switched or punted for further processing. For a TCP packet that is destined for the router itself, the actual decapsulation is performed in the IP process after the packet has been punted. Similarly, the arp_decaps element 59 simply punts the packet to the ARP process.

As indicated by the dashed lines 79, the process of chain walking can be implemented by having each chain element return to the chain walker 55 a pointer to the next chain element. The chain walker then calls the next element in the chain.

After decapsulation, the router must prepare the packet for further transmission by encapsulating it in the desired protocol, assuming the packet is not intended for the router itself. Dashed line 88 separates the decapsulation chain 64 from the encapsulation chain 74. The packet is passed from the ip_switch element 69 to an encapsulation chain 74 associated with the intended output HDLC interface 53, beginning with the ip_rewrite element 70. Ip-rewrite 70 performs functions such as updating (decrementing) the time-to-live count in an IP packet's header, and recalculating the check sum for the IP header.

The packet is then passed to the compression element 71, the encryption element 73 and finally to an HDLC encapsulation element 77. The encapsulation element 77 then passes the packet to the queue 81 for the intended output interface 53. A scheduler 83 removes the packet from the queue 81 and transmits via the HDLC interface 53.

Packets do not need to be switched in the de-encapsulation chain walk. Rather, they can be handed to an outside process for further processing and then passed back to the start of the encapsulation chain. This is done for 'ping' packets that are destined for the router, for example. A chain walk can be stopped, started or resumed from any point on the chain. This allows elements such as an encryption element to pass the packet to an outside process, or piece of hardware, to perform the actual encryption.

The processed packet may then be passed back to continue the chain walk. This mechanism is called 'punts and ' 'puntback'. The punting element hands the packet to the outside process or hardware. If the punting element wants the packet to resume the chain walk at the next element in the chain, it stores the chain next node pointer in the packet. The puntback routine starts the chain walk with the node previously stored in the packet.

For example, as indicated by lines 87, an element such as encryption element 73 can pass the packet to an encryption process 75 which is external to the chain. This is known as "punting" the process packet. The packet may be returned to the punting element, encryption element 73 in this example, after processing.

Alternatively, the chain walk could resume processing with any element in the chain.

ARP, SAP and SNAP are various protocols which fall under the IP protocol family. As shown with respect to the ARP, SAP and SNAP decapsulation elements 59, 61 and 63 respectively, packets may be processed by additional processes 60, 62, 66 external to the chains. Packets processed by these functions 60, 62, 66 may then be queued directly at queue 81 without passing through an encapsulation chain.

Of course, while only IP, ARP, SAP and SNAP decapsulation chains are shown, additional protocols can also be supported for this interface 51. Each protocol would have its own decapsulation chain.

Note that although the incoming and outgoing interfaces are typically different interfaces, this is not always true. For example, Ping and ARP are protocols where the incoming and outgoing interface is typically the same interface.

Figure 4B:
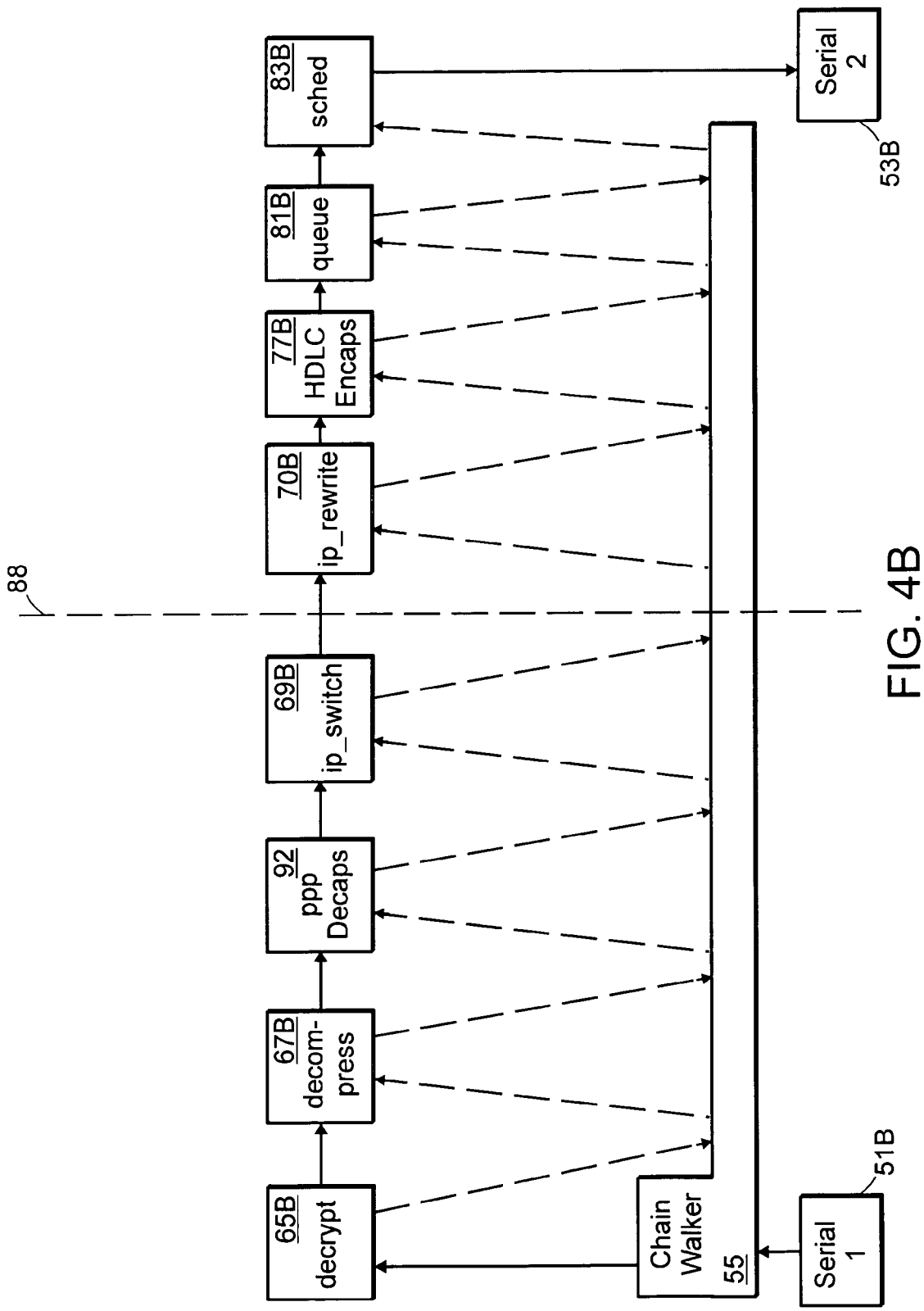
FIG. 4B is a schematic diagram of an embodiment of the present invention with different chains.

FIG. 4B illustrates chains which are more practical than those of FIG. 4A, which shows many elements for illustrative purposes.

FIG. 4B shows two interfaces: Serial 1 51B and Serial 2 53B. The decaps chain encompasses a decryption element 65B, a decompress element 67B, a point to point protocol (PPP) decapsulation element 92, and an ip_switch element 69B. The encapsulation chain comprises an ip_rewrite element 70B, HDLC encapsulation element 77B, and queue element 81B, followed by a schedule element 83B which passes the packet to the output serial port Serial 2 53B.

A default demux element is associated with each interface based on the interface media type, e.g., ethernet, HDLC, etc. Configuration information is determined for each interface, for example, by reading it from a file or from a programmable memory. Default queuing and scheduling elements are then added to the chain. Finally, decapsulation and encapsulation elements are added to each interface according to the protocols available as determined by the configurations. Based on the user-supplied configuration, it is possible to replace default chain elements with user-configured elements.

Once the chain for an interface is built, the interface is ready for packet processing. When a packet is received by an interface it is handed to the chain walker, as described with respect to FIG. 4A. The chain walker has no knowledge of protocols. For an encapsulation of IP over ethernet, the chain might include only an IP decapsulation element, followed by an encapsulation chain comprising ethernet encapsulation, queuing and scheduling elements.

Chains can have elements added or deleted based on configuration. Each element in a chain has no specific knowledge of the other elements on the chain. The chain walker has no knowledge of the number of elements or types of protocols on a chain. Each element or node on the chain determines the whether or not the chain walk continues based on its processing of the packet.

The above chain could thus be modified by inserting or removing elements into or from the chains without changing the ethernet, IP, queuing or scheduling elements. For example, an ethernet address filter could be inserted before the IP decapsulation element, or a new compression element could be inserted at the beginning of the encapsulation chain.

For packets entering the router from an interface, the chain walker typically starts with the demux element. While there can be any number of encapsulation and de-encapsulation elements chained together on an interface, there is typically only one demux element for each interface. For packets that are sourced on the router, the chain walk starts with the first encapsulation element.

To fully utilize the concept of chains and exploit modularity provided by this concept, decapsulation and encapsulation chains can be built dynamically at run time.

Figure 5:
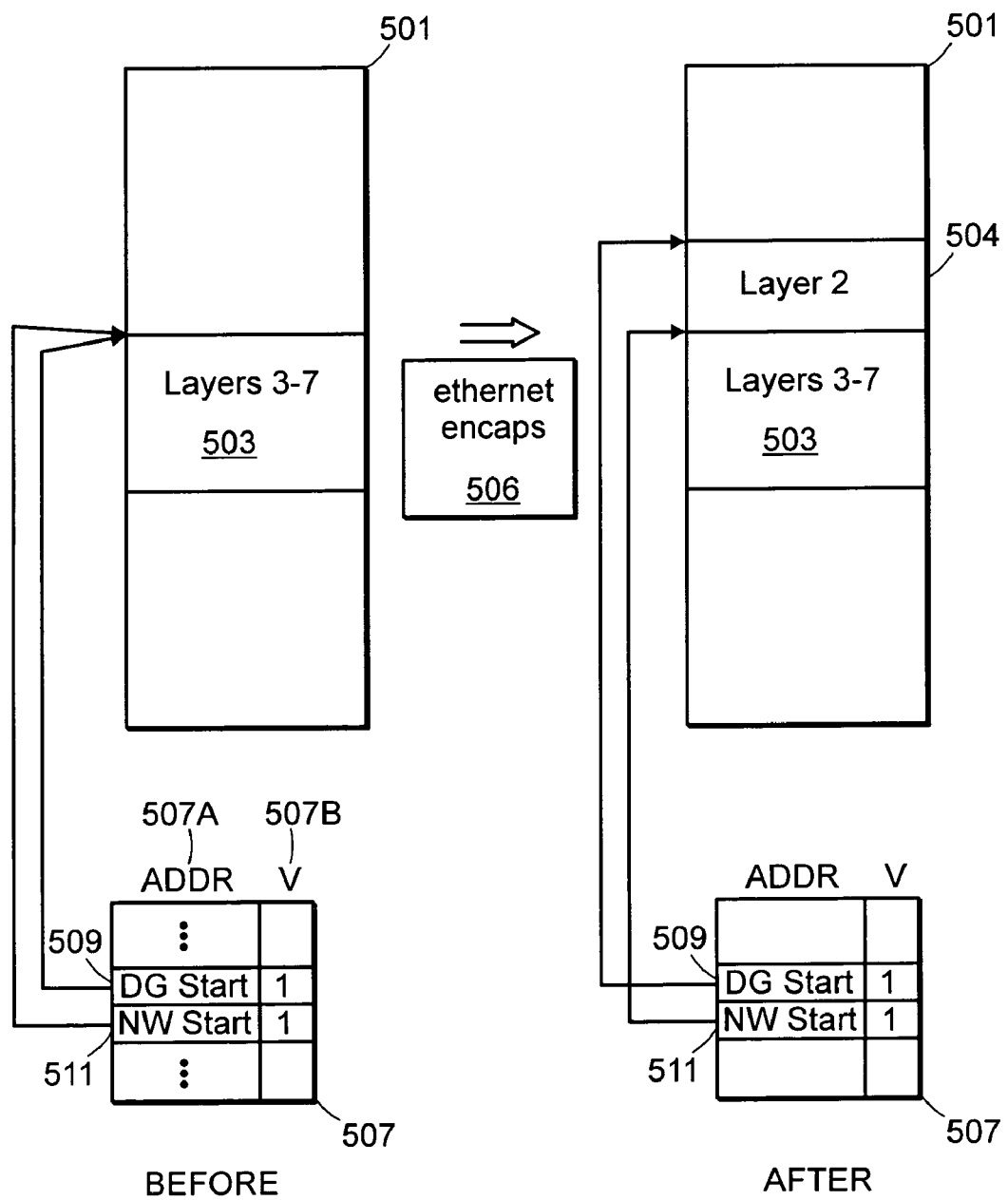
FIG. 5 is a schematic diagram which illustrates an example of the progression of a packet through a node.

FIG. 5 is a schematic diagram which illustrates an example of the progression of a packet through a node, here an ethernet encapsulation node 506. The packet is stored in a buffer 501 while being processed. Extra buffer space around the packet allows for expansion for encapsulation headers and other information.

Note that the handoff of the packet from one node to another is effected by the transfer of a pointer to the packet. The various modules or nodes all have common access to a shared memory buffer 501. Transferring actual packet contents from module to module would create a serious performance bottleneck.

A data structure 507 contains the pointers to various parts of the packet such as the datagram start (DGSTART) 509 and network start (NWSTART) 511. A valid flag 507B indicates whether or not the corresponding address 507A or other information in the structure 507 is valid.

In the example of FIG. 5, before processing by the ether encaps node 506, the entire packet comprises information corresponding to layers 3–7 of the OSI model. Both DGSTART 509 and NSTART 511 are valid and both point to the same location in the buffer 501.

The ether encaps node 506 prepends an ethernet header, or layer 2 information 504 to the layers 3–7 information 503. Thus, after completion of the ether encaps node's operation, DGSTART 509 now points to the beginning of the new ethernet header 504.

Similarly, each chain node when called by the chain walker performs some operation which may include an operation on the packet, using the data structure 507 to determine where the various parts of the packet are.

Figure 6:
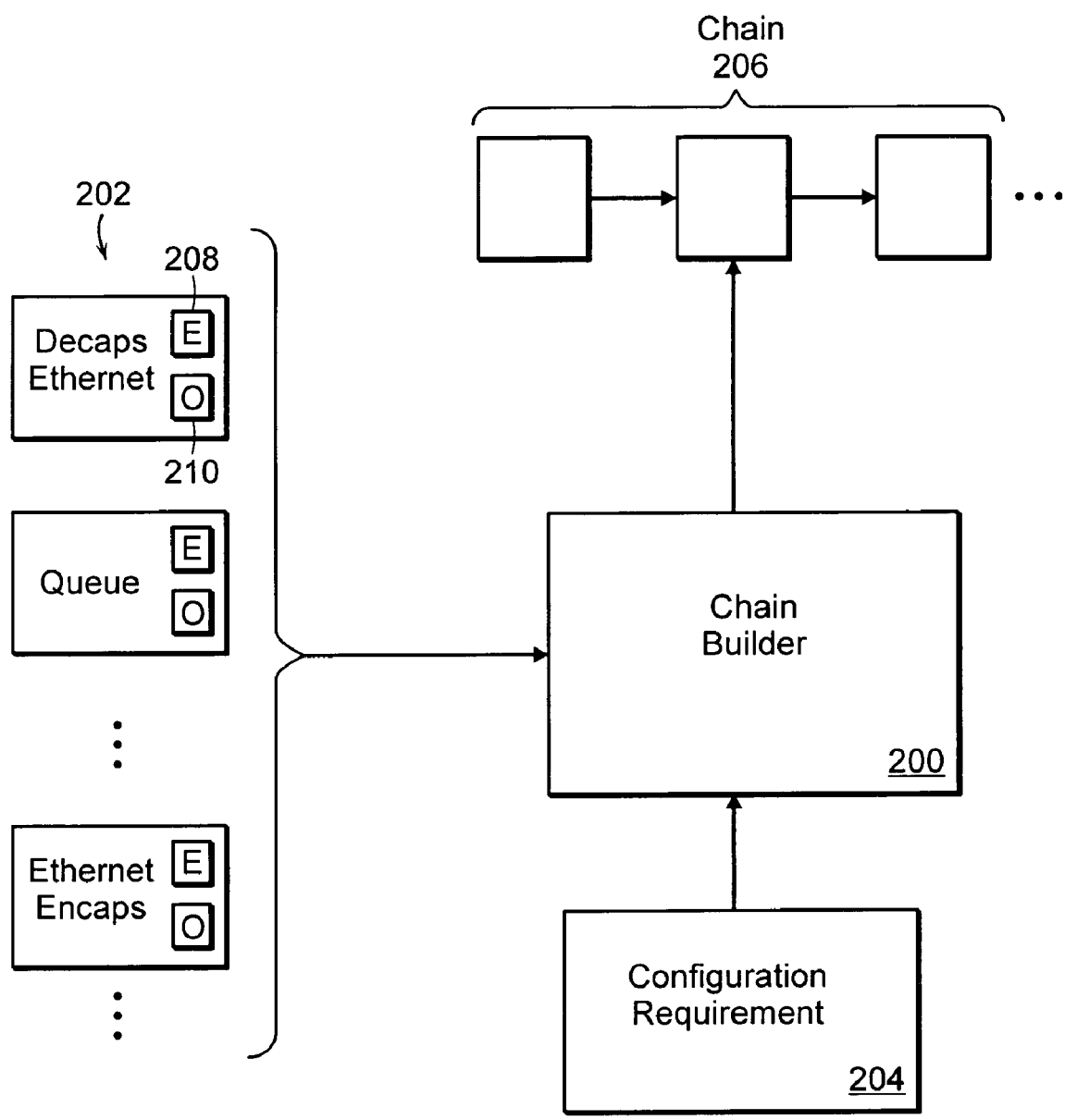
FIG. 6 is a schematic diagram of a chain builder embodiment of the present invention.

FIG. 6 is a schematic diagram of a chain builder embodiment of the present invention.

To enable the building of optimal chains, each available node 202 provides expectation information 208 about what conditions it expects to be satisfied and what conditions 210 it guarantees by its own operation. A chain builder 200 uses these "expectation" and "operation" masks or lists, 208 and 210 respectively, to build an efficient chain 206.

For example, if a high-speed node expects the datagram to be aligned within the buffer 501, and the prior node aligns the datagram, the high speed solution can be used. On the other hand, if the datagram is not aligned, a slower, more general purpose node might be used to process the node.

The expectation map 208 of a node lists various conditions which the node expects to be satisfied. Such conditions may include, but are not limited to, the existence of certain valid pointers and/or a certain alignment of the packet in the buffer. Two exemplary pointers, discussed earlier with reference to FIG. 5, are datagram start (DGSTART), which is a pointer to the beginning of the datagram in the memory buffer 501, and network start (NWSTART), which is a pointer to the beginning of the network layer within the packet.

The service node may also expect that they can be inserted before or after specific encapsulation or decapsulation is performed. For example, layer 2 (L2) filtering may expect that it is inserted before a layer 2 processing node. Any node that performs L2 decapsulation will satisfy this condition.

In one embodiment, these conditions are defined by 32-bit magic numbers for simplicity and performance. For example, magic numbers within the range of 0x80000000 to 0x80001000 are reserved for quality of service, i.e., queuing, nodes.

That is, all nodes that expect that quality of service has been performed and that packets will not be reordered will be assigned magic numbers higher than 0x80001000.

Information in the map can include, but is not limited to, whether a field is set, i.e., whether it holds a valid value/pointer, and whether the value is aligned, and if so, whether it is 16-bit or 32-bit aligned. The "operation" mask of a node then "advertises" what properties these fields will have when the node has completed its operation.

The chain builder 200 builds a chain 206 of elements according to some configuration requirement 204. The chain builder may build this chain upon a power-up, or upon some other event, including but not limited to the modification of an existing configuration requirement, or the introduction of a new configuration requirement.

A set of elements 202 is available to the chain builder 200. Each element provides expectations indications 208, that is, indications of certain conditions it expects to have been satisfied before it is called to process a packet. In addition, each element provides operations indications 210, that is, indications of certain conditions which it ensures upon completion of its operation.

The chain builder 200 takes these elements 202 and places them into the chain 206 according to the configuration requirements 204 such that each element's indicated operations satisfy its immediate successor's indicated expectations.

As an example, a simple configuration requirement might be as follows:

| Interface  | Ethernet | 0             |
|------------|----------|---------------|
| IP Address | 1.1.1.1  | 255.255.255.0 |

Figure 1:
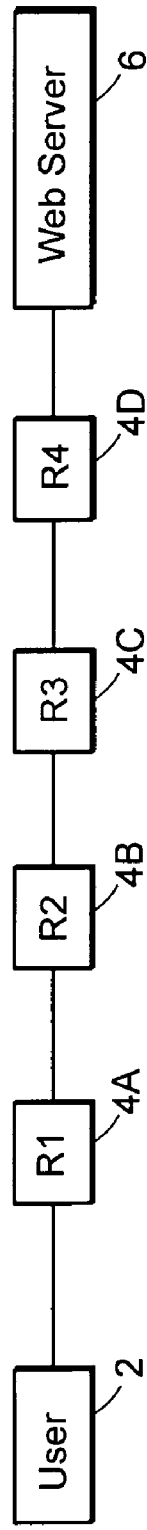
FIG. 1 is a block diagram of an example of a network connection between a user and a web page.
Figure 7:
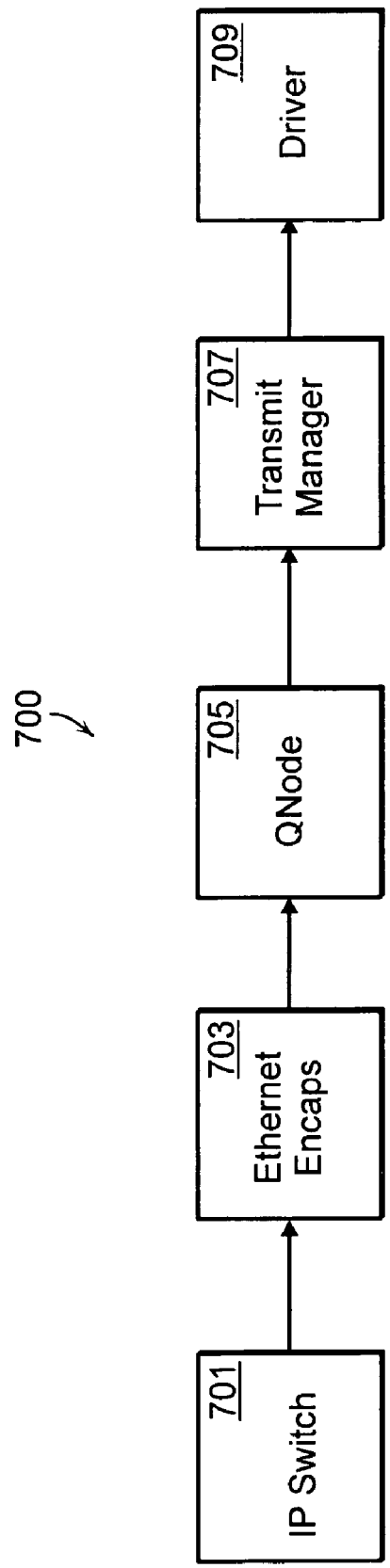
FIG. 7 is a block diagram of the encapsulation chain which the chain builder of FIG. 6 would attempt to build in response to a configuration requirement.

FIG. 7 is a block diagram of the encapsulation chain 700 which the chain builder 200 would attempt to build in response to this configuration requirement. The chain 700 comprises five nodes include and IP Switch node 701, an Ethernet Encaps node 703, a QNode 705, a Transmit Manager 707 and a Driver 709.

The IP Switch 701 node accesses the packet at NWSTART, i.e., the beginning of layer 3, to read the destination IP address and to direct the packet to the appropriate output interface. Once the output interface has ben determined, the IP Switch node 701 updates an internal packet header field that points to a structure that describes the output interface.

The EtherEncaps node 703 writes layer 2 information into a packet, as described previously with reference to FIG. 5.

The QNode 705 stores packets when the driver 709 becomes congested. Congestion occurs when the driver 709 is sent more data than it can output onto its output port. The QNode queue only queues packet pointers, not the packets themselves.

The Transmit Manager 707 is a consistent proxy representation for the driver 709. When the driver 709 becomes congested, the Transmit Manager 707 sets a flag in real time that the QNode 705 can periodically check.

Figure 8A:
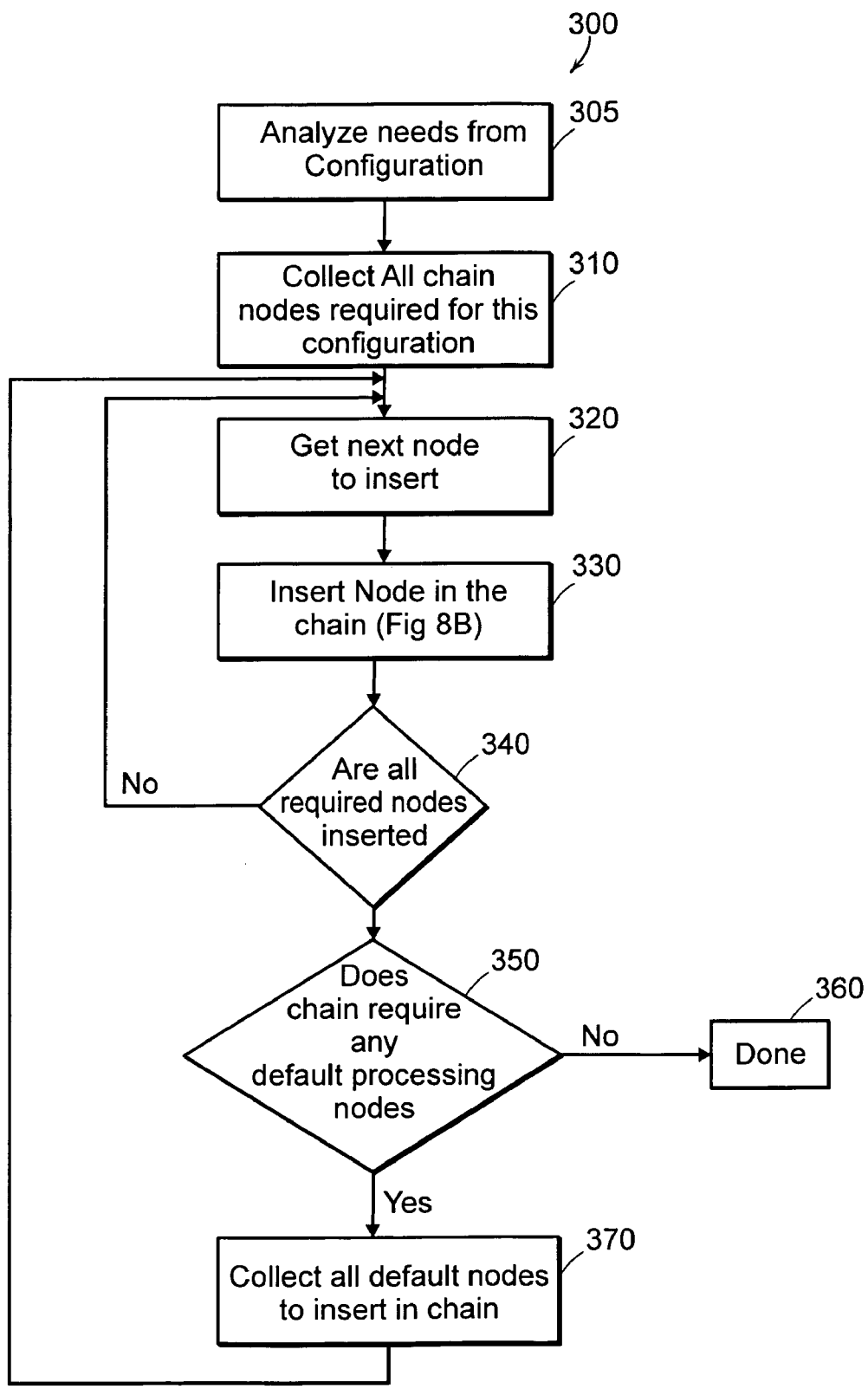
FIG. 8A is a flow chart illustrating at a high level the operation of a particular embodiment of the chain building process of the current invention.

FIG. 8A is a flow chart illustrating at a high level the chain building process 300 for a particular embodiment of the current invention.

First, in step 305, the chain builder analyzes a particular configuration provided, for example, in a configuration file at start-up time or downloaded or entered at a later time by a user.

As a result of the analysis of step 305, in step 310, the chain builder selects a set of processing nodes that may be required for this configuration. These nodes are inserted into the chain in the following steps.

Figure 8B:
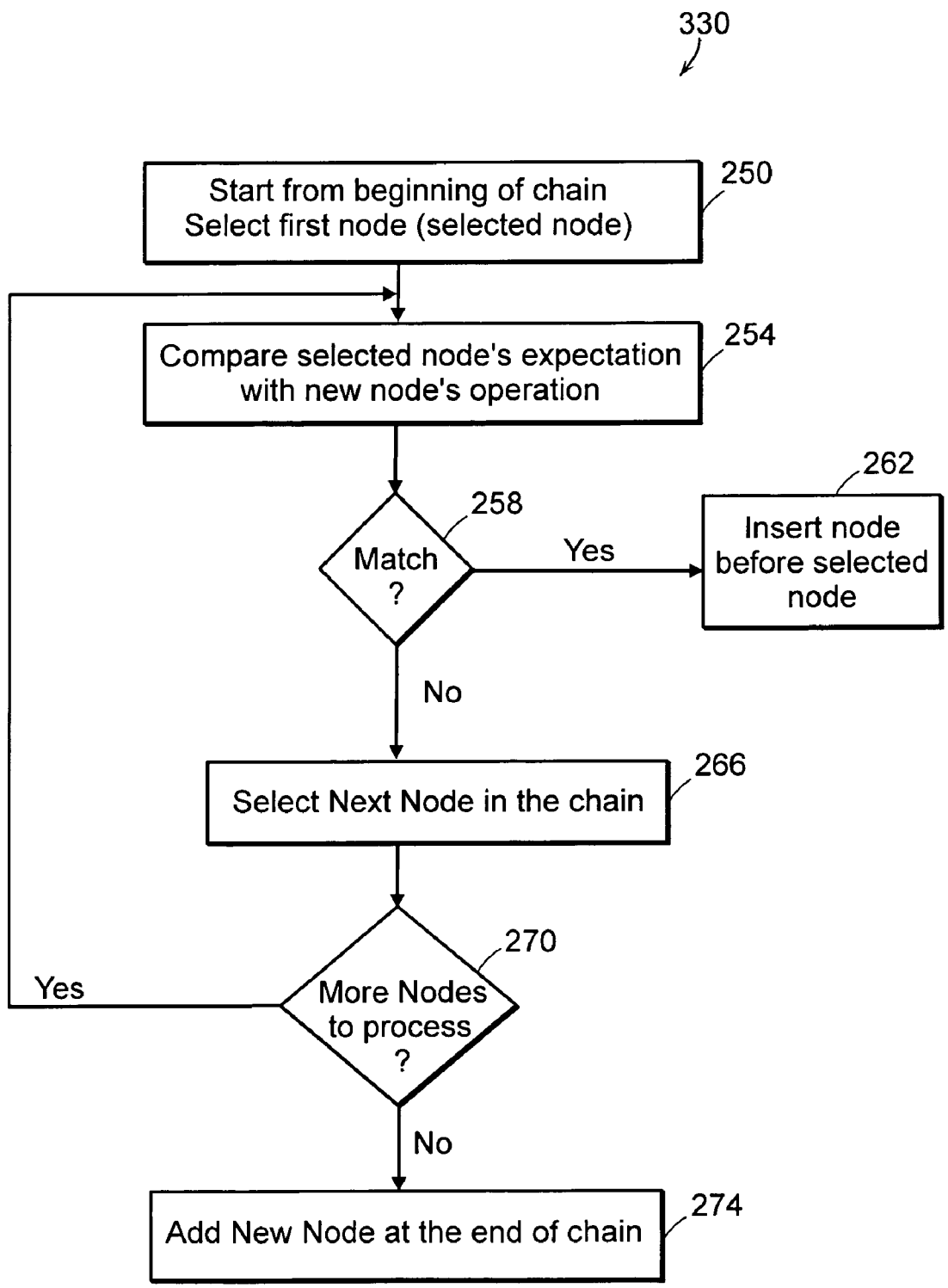
FIG. 8B is a flow chart illustrating at a high level the operation of a particular embodiment of inserting a node in the chain of the current invention.

In step 320, the chain builder selects a node from the set of nodes collected in step 310. In step 330, the selected node is inserted into the chain at the appropriate place. Details of step 330 are illustrated in FIG. 8B, discussed below. After the node has been inserted into the chain, the chain builder, at step 340, checks whether all required nodes from the set collected in step 310 have been inserted in the chain. If more nodes are required, then steps 320 through 340 are repeated for each remaining required node.

If all required nodes have been inserted into the chain, then in step 350, the chain builder checks the consistency of the chain and selects any default nodes that must be present in the chain. If there are no default nodes required in the chain, then chain building process is complete (step 360).

If some default nodes need to be inserted, then the chain builder collects a list of default nodes that need to be inserted in the chain (step 370) and repeats steps 320 through 370 for each necessary default node.

FIG. 8B is a flow chart illustrating, at a high level, the operation of inserting a node into a chain (step 330 of FIG. 8A) for a particular embodiment of the current invention.

In step 250, the chain builder selects the first node of the chain as a candidate insertion point. In step 254, expectations of the node selected in step 250 are compared against operations provided by the node to be inserted, i.e., the new node. A particular implementation of the present invention employs "magic numbers," which are compared. If the magic number of the new node is less then the magic number of the selected node, then it is assumed that the new nodes provides the operation required by the selected node.

If, in step 258, an expectations/operations match is found, then the chain builder inserts the new node into the chain before the selected node (step 262).

If, on the other hand, there is no match, i.e., the new node does not provide an operation required by the selected node, then the chain builder selects the next node from the chain as the next candidate insertion point (step 266).

In step 270, the chain builder checks whether there are additional nodes remaining to be selected from the chain as candidate insertion points. If there are remaining nodes, then steps 254 through 270 are repeated. If there are no more elements left in the chain, then the chain builder adds the new node to the end of the chain (step 274).

While a particular embodiment has been described in which a chain is built from beginning to end, a chain can also be built from end to beginning, or even from the middle out.

It will be apparent to those of ordinary skill in the art that methods involved in the present system for dynamically building encapsulation and decapsulation chains at run time may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for dynamically building a packet processing chain, comprising:

providing a plurality of packet processing elements;

for each of a first subset of elements, providing operations indications of conditions which the element ensures upon completion of its operation;

for each of a second subset of elements, providing expectations indications of conditions the element expects to have been satisfied before it is called to process a packet; and building the chain by combining elements to form the chain according to a configuration requirement, a first element from the first subset executing in the chain prior to a second element from the second subset, wherein the operations indications of the first element satisfy the expectations indications of the second element.

2. The method of claim 1, wherein an expectation is that a predetermined field holds a valid value.

3. The method of claim 2, wherein the predetermined field holds a pointer to a datagram start.

4. The method of claim 2, wherein the predetermined field holds a pointer to a network layer start.

5. The method of claim 1, wherein an expectation is that a predetermined field is aligned.

6. The method of claim 1, wherein building the chain is performed in response to any of the group consisting of power-up, modification to the configuration requirement, and creation of a new configuration requirement.

7. The method of claim 1, wherein the chain performs at least one encapsulation function.

8. The method of claim 1, wherein the chain performs at least one decapsulation function.

9. The method of claim 1, wherein the chain performs at least one service function.

10. The method of claim 9, wherein a service function is input/output filtering.

11. The method of claim 9, wherein a service function is network address translation.

12. The method of claim 9, wherein a service function is compression.

13. The method of claim 9, wherein a service function is encryption.

14. The method of claim 1, wherein an expectation is that a predetermined encapsulation/decapsulation has been performed.

15. The method of claim 1, wherein an expectation is that a predetermined encapsulation/decapsulation has not been performed.

16. The method of claim 1, wherein an expectation is that a predetermined service function has been performed.

17. The method of claim 1, wherein an expectation is that a predetermined service function has not been performed.

18. The method of claim 1, further comprising:
assigning magic numbers to elements, the magic numbers being indicative of expectations/operations of an element, wherein a chain is built by ordering selected elements according to their respective magic numbers.

19. A packet routing system, comprising:
a plurality of packet processing elements, where each element provides indications of its expectations and its operations, the expectation indications defining conditions the element expects to have been satisfied before it is called to process a packet and the operations indications defining conditions which the element ensures upon completion of its operation; and
a chain builder which builds a chain according to a configuration requirement by combining a subset of elements to form the chain, such that the operations indications of an element in the chain satisfy the expectations indications of a following element.

20. The system of claim 19, wherein an expectation is that a predetermined field holds a valid value.

21. The system of claim 20, wherein the predetermined field holds a pointer to a datagram start.

22. The system of claim 20, wherein the predetermined field holds a pointer to a network layer start.

23. The system of claim 19, wherein an expectation is that a predetermined field is aligned.

24. The system of claim 19, wherein the chain builder builds the chain responsive to any of the group consisting of power-up, modification to the configuration requirement, and creation of a new configuration requirement.

25. The system of claim 19, wherein the chain performs at least one encapsulation function.

26. The system of claim 19, wherein the chain performs at least one decapsulation function.

27. The system of claim 19, wherein the chain performs at least one service function.

28. The system of claim 27, wherein a service function is input/output filtering.

29. The system of claim 27, wherein a service function is network address translation.

30. The system of claim 27, wherein a service function is compression.

31. The system of claim 27, wherein a service function is encryption.

32. The system of claim 19, wherein an expectation is that a predetermined encapsulation/decapsulation has been performed.

33. The system of claim 19, wherein an expectation is that a predetermined encapsulation/decapsulation has not been performed.

34. The system of claim 19, wherein an expectation is that a predetermined service function has been performed.

35. The system of claim 19, wherein an expectation is that a predetermined service function has not been performed.

36. The system of claim 19 wherein magic numbers are assigned to elements, the magic numbers being indicative of expectations/operations of an element, wherein a chain is built by ordering selected elements according to their respective magic numbers.

37. A packet routing system, comprising:
a plurality of packet processing means;
expectations indication means defining conditions expected to have been satisfied before processing a packet for at least one packet processing means;
operations indication means defining conditions ensured upon completion of operation for at least one packet processing means; and
means for building a chain comprising at least one of said packet processing means by combining a subset of said plurality of packet processing means, according to a configuration requirement, such that the operations of a first element in the chain satisfy the expectations of a second element's in the chain.

38. A computer program product for use in a computer network router, the computer program product comprising a computer usable medium having computer readable program code means embodied in the medium for building a chain to process a packet, the computer usable medium comprising:
computer readable program code means for providing a plurality of packet processing elements;
computer readable program code means for providing operations indications for each of a first subset of elements, the operations indications defining conditions which the element ensures upon completion of its operation;
computer readable program code means for providing expectations indications for each of a second subset of elements, the expectation indications defining conditions the element expects to have been satisfied before it is called to process a packet; and
computer readable program code means for building the chain by combining elements according to a configuration requirement, a first element from the first subset executing in the chain prior to a second element from the second subset, wherein the operations indications of the first element satisfy the expectations indications of the second element.

* * * * *